United States Patent
Razdan et al.

(10) Patent No.: US 6,397,302 B1
(45) Date of Patent: May 28, 2002

(54) METHOD AND APPARATUS FOR DEVELOPING MULTIPROCESSOR CACHE CONTROL PROTOCOLS BY PRESENTING A CLEAN VICTIM SIGNAL TO AN EXTERNAL SYSTEM

(75) Inventors: Rahul Razdan, Princetown; James B. Keller, Waltham; Richard E. Kessler, Shrewsbury, all of MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/099,304

(22) Filed: Jun. 18, 1998

(51) Int. Cl.[7] .............................................. G06F 12/12
(52) U.S. Cl. ....................... 711/141; 711/144; 711/146; 711/134
(58) Field of Search ................................. 711/120, 143, 711/144, 118, 146, 133, 134, 141, 142, 145

(56) References Cited

U.S. PATENT DOCUMENTS

| | | | | |
|---|---|---|---|---|
| 5,655,100 A | * | 8/1997 | Ebrahim et al. | 711/144 |
| 5,684,977 A | * | 11/1997 | Loo et al. | 711/143 |
| 5,706,463 A | * | 1/1998 | Ebrahim et al. | 711/120 |
| 5,829,038 A | * | 10/1998 | Merrell et al. | 711/143 |
| 5,905,998 A | * | 5/1999 | Ebrahim et al. | 711/144 |
| 6,105,108 A | * | 8/2000 | Steely, Jr. et al. | 711/118 |

* cited by examiner

*Primary Examiner*—Matthew Kim
*Assistant Examiner*—Brian R. Peugh
(74) *Attorney, Agent, or Firm*—Conley, Rose & Tayon, P.C.

(57) ABSTRACT

A multiprocessor system includes a plurality of processors, each processor having one or more caches local to the processor, and a memory controller connectable to the plurality of processors and a main memory. The memory controller manages the caches and the main memory of the multiprocessor system. A processor of the multiprocessor system is configurable to evict from its cache a block of data. The selected block may have a clean coherence state or a dirty coherence state. The processor communicates a notify signal indicating eviction of the selected block to the memory controller. In addition to sending a write victim notify signal if the selected block has a dirty coherence state, the processor sends a clean victim notify signal if the selected block has a clean coherence state.

13 Claims, 3 Drawing Sheets

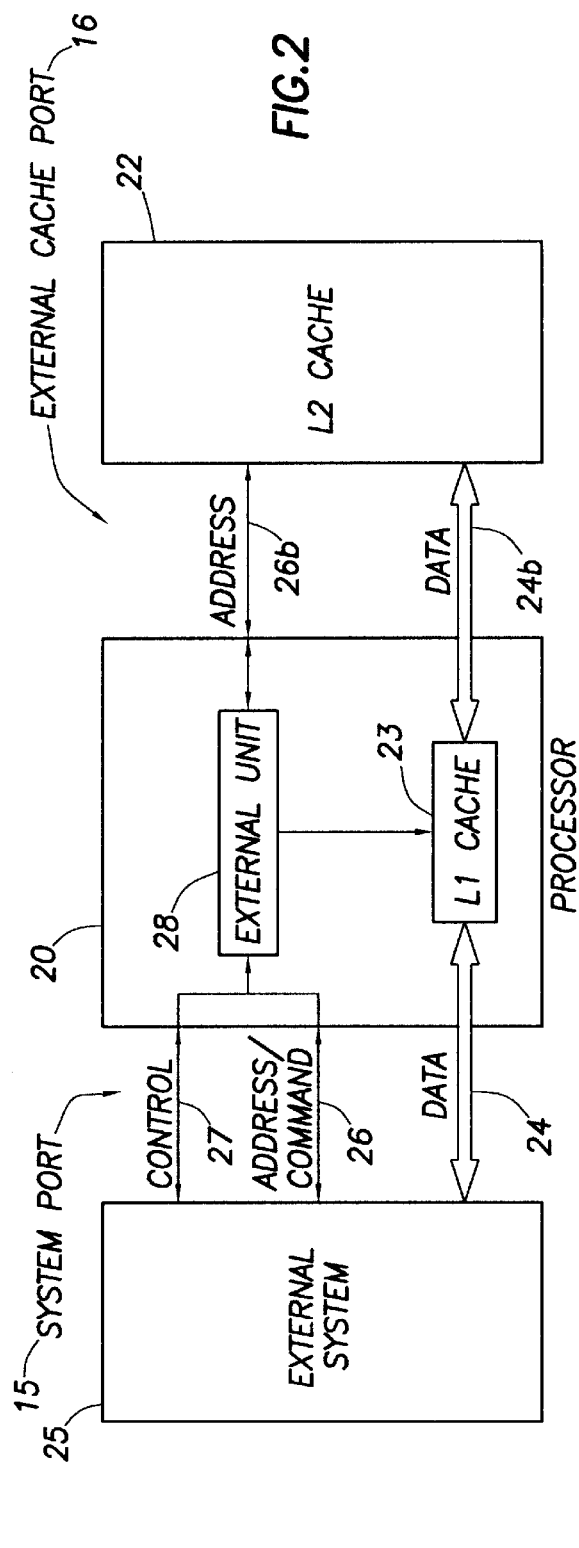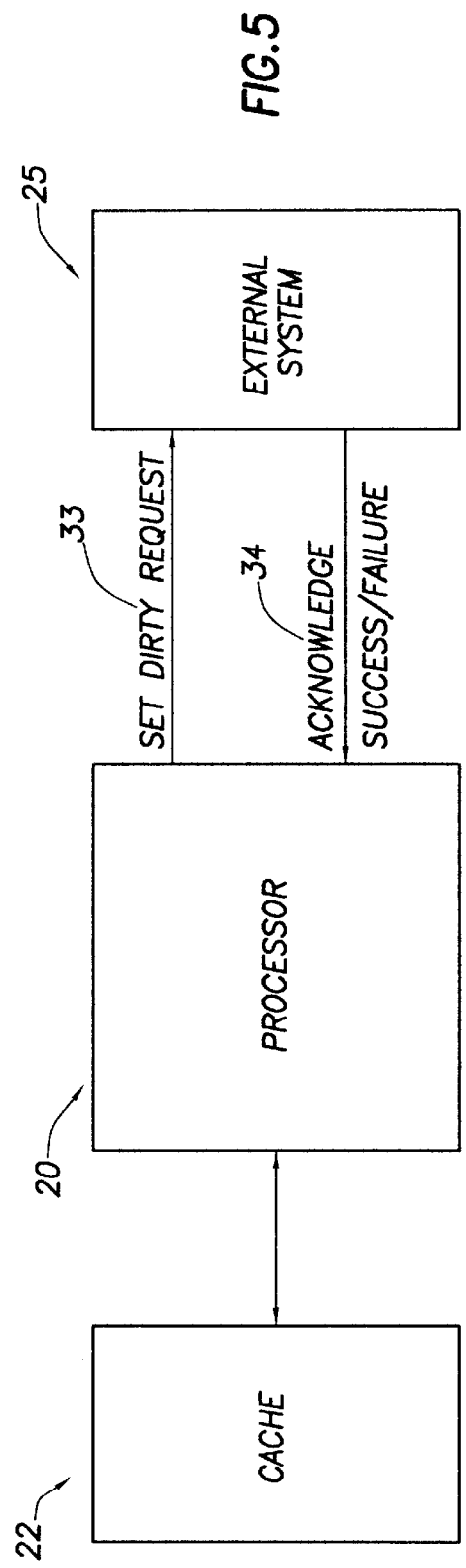

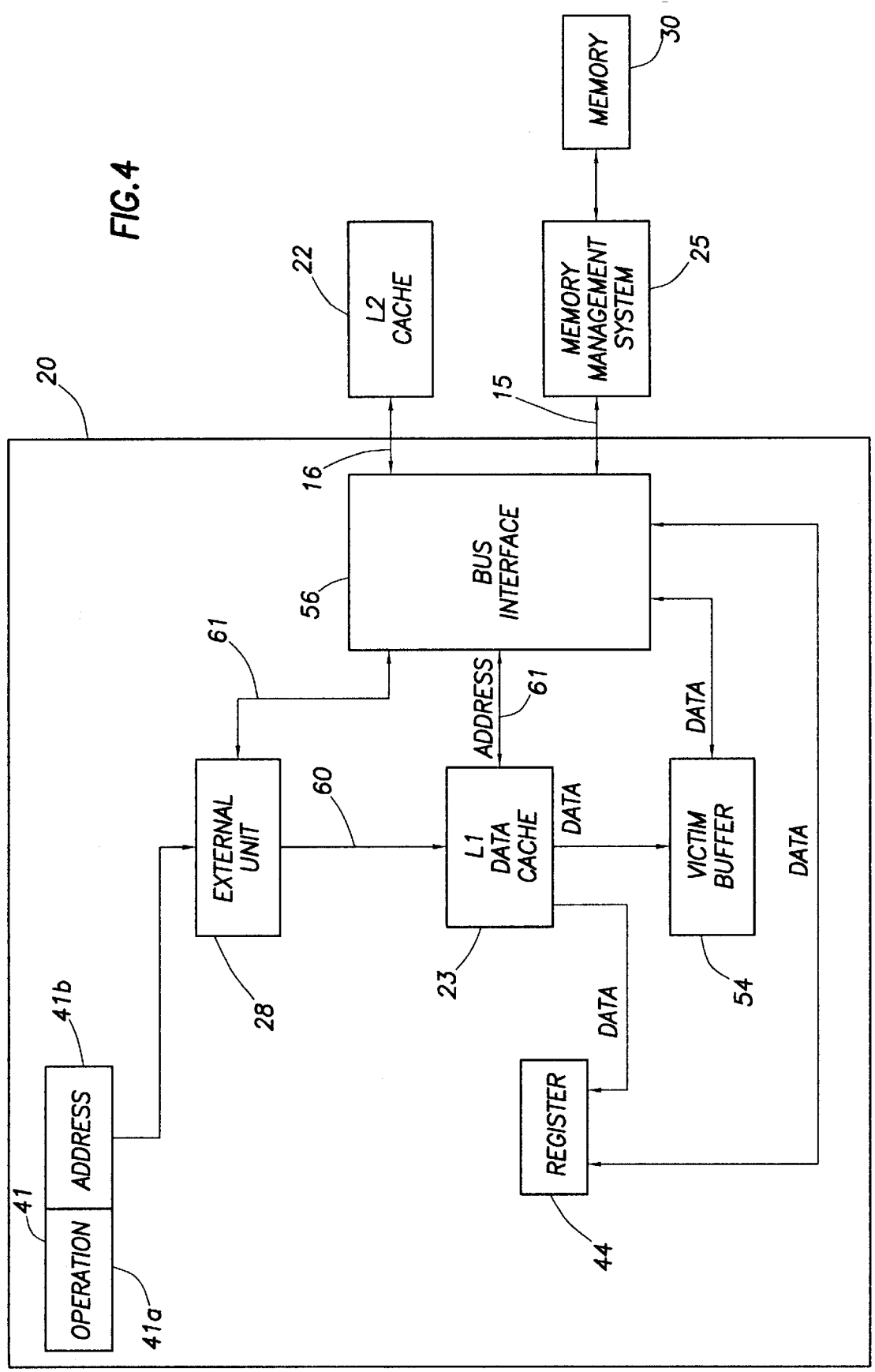

US 6,397,302 B1

METHOD AND APPARATUS FOR DEVELOPING MULTIPROCESSOR CACHE CONTROL PROTOCOLS BY PRESENTING A CLEAN VICTIM SIGNAL TO AN EXTERNAL SYSTEM

CROSS-REFERENCE TO RELATED APPLICATIONS

This Application relates to the applications entitled:
METHOD AND APPARATUS FOR PERFORMING SPECULATIVE MEMORY REFERENCES TO THE MEMORY INTERFACE (U.S. application Ser. No. 09/099,399, filed, Jun. 18, 1998) and
METHOD AND APPARATUS FOR RESOLVING PROBES IN MULTIPROCESSOR SYSTEMS WHICH DO NOT USE EXTERNAL DUPLICATE TAGS FOR PROBE FILTERING(U.S. application No. 09/099,400, filed, Jun. 18, 1998) and
METHOD AND APPARATUS FOR MINIMIZING PIN-COUNT NEEDED BY EXTERNAL MEMORY CONTROL CHIP FOR MULTIPROCESSORS WITH LIMITED MEMORY SIZE REQUIREMENTS (U.S. application Ser. No. 09/099,383, filed, Jun. 18, 1998) and
METHOD AND APPARATUS FOR PERFORMING SPECULATIVE MEMORY FILLS INTO A MICROPROCESSOR(U.S. application Ser. No. 09/099,396, filed, Jun. 18, 1998) and
METHOD AND APPARATUS FOR DEVELOPING MULTIPROCESSOR CACHE CONTROL PROTOCOLS USING ATOMIC PROBE COMMANDS AND SYSTEM DATA CONTROL RESPONSE COMMANDS (U.S. application Ser. No. 09/099,398, filed, Jun. 18, 1998) AND
METHOD AND APPARATUS FOR DEVELOPING MULTIPROCESSOR CACHE CONTROL PROTOCOLS USING AN EXTERNAL ACKNOWLEDGMENT SIGNAL TO SET A CACHE TO A DIRTY STATE (U.S. application Ser. No. 09/099,384, filed Jun. 18, 1998) and
METHOD AND APPARATUS FOR DEVELOPING MULTIPROCESSOR CACHE CONTROL PROTOCOLS USING A MEMORY MANAGEMENT SYSTEM GENERATING ATOMIC PROBE COMMANDS AND SYSTEM DATA CONTROL RESPONSE COMMANDS (U.S. application Ser. No. 09/099,385, filed, Jun. 18. 1998) and
METHOD AND APPARATUS FOR DEVELOPING MULTIPROCESSOR CACHE CONTROL PROTOCOLS USING A MEMORY MANAGEMENT SYSTEM GENERATING AN EXTERNAL ACKNOWLEDGMENT SIGNAL TO SET A CACHE TO A DIRTY COHERENCE STATE (U.S. application Ser. No. 09/099,386, filed, Jun. 18, 1998) and
METHOD AND APPARATUS FOR DEVELOPING MULTIPROCESSOR CACHE CONTROL PROTOCOLS USING A MEMORY MANAGEMENT SYSTEM TO RECEIVE A CLEAN VICTIM SIGNAL (U.S. application Ser. No. 09/099,387, filed, Jun. 18, 1998).

These applications are filed simultaneously herewith in the U.S. Patent & Trademark Office.

TECHNICAL FIELD

The present invention relates generally to computer processor technology. In particular, the present invention relates to cache coherency for a shared memory multiprocessor system.

BACKGROUND ART

A state of the art microprocessor architecture may have one or more caches for storing data and instructions local to the microprocessor. A cache may be disposed on the processor chip itself or may reside external to the processor chip and be connected to the microprocessor by a local bus permitting exchange of address, control, and data information. By storing frequently accessed instructions and data in a cache, a microprocessor has faster access to these instructions and data, resulting in faster throughput.

Conventional microprocessor-cache architectures were developed for use in computer systems having a single computer processor. Consequently, conventional microprocessor-cache architectures are inflexible in multi-processor systems in that they do not contain circuitry or system interfaces which would enable easy integration into a multiprocessor system while ensuring cache coherency.

A popular multiprocessor computer architecture consists of a plurality of processors sharing a common memory, with each processor having its own local cache. In such a multiprocessor system, a cache coherency protocol is required to assure the accuracy of data among the local caches of the respective processors and main memory. For example, if two processors are currently storing the same data block in their respective caches, then writing to that data block by one processor may effect the validity of that data block stored in the cache of the other processor, as well as the block stored in main memory. One possible protocol for solving this problem would be for the system to immediately update all copies of that block in cache, as well as the main memory, upon writing to one block. Another possible protocol would be to detect where all the other cache copies of a block are stored and mark them invalid upon writing to one of the corresponding data block stored in the cache of a particular processor. Which protocol a designer actually uses has implications relating to the efficiency of the multiprocessor system as well as the complexity of logic needed to implement the multiprocessor system. The first protocol requires significant bus bandwidth to update the data of all the caches, but the memory would always be current. The second protocol would require less bus bandwidth since only a single bit is required to invalidated appropriate data blocks. A cache coherency protocol can range from simple, (e.g., write-through protocol), to complex, (e.g., a directory cache protocol). In choosing a cache coherence protocol for a multiprocessor computer system, the system designer must perform the difficult exercise of trading off many factors which effect efficiency, simplicity and speed. Hence, it would be desirable to provide a system designer with a microprocessor-cache architecture having uniquely flexible tools facilitating development of cache coherence protocols in multiprocessor computer systems.

A present day designer who wishes to construct a multiprocessor system using a conventional microprocessor as a component must deal with the inflexibility of current microprocessor technology. Present day microprocessors were built with specific cache protocols in mind and provide minimal flexibility to the external system designer. For example, one common problem is that a cache of a microprocessor is designed so that a movement of a data block out of a cache automatically sets the cache state for the block to a predetermined state. This does not give a designer of a multiprocessor system the flexibility to set the cache to any state in order to implement a desired cache protocol. Because of this significant complexity is necessarily added to the design of a cache protocol.

SUMMARY DISCLOSURE OF THE INVENTION

In accordance with the present invention, a computing apparatus includes a cache, an evictor unit, and a signaling unit. The cache includes a plurality of blocks. The evictor unit selects a first block of data from the plurality of blocks to be removed from the cache. The first block of data has an unmodified coherence state. The signaling unit transmits a notify signal indicating the removal of the first block from the cache. Typically, the unmodified coherence state of the first block in the cache is a clean coherence state and the notify signal is a clean victim signal. The coherence state may include additional attributes, for example, a clean state may be clean/shared, and a dirty state may be dirty/shared.

Typically, the evictor unit and the signaling unit are included in an external unit of a processor, the external unit providing an interface for communication of information to an external system. An external system may include a memory management system or a memory controller.

In a further aspect of the present invention, the processor may have one or more caches and the cache may be an L1 cache or an L2 cache.

In yet a further aspect of the present invention, the evictor unit is further configured to select a second block from the plurality of blocks. The second block has a modified coherence state. The signaling unit is further configured to transmit another notify signal indicating removal of the second block from the cache. Typically, the modified coherence state of the second block in the cache is a dirty coherence state and the another notify signal is a write victim signal.

In yet another aspect, the computing apparatus includes an address bus and the evictor unit is further configured to transmit an address associated with the first block and an address associated with the second block onto the address bus.

In a further aspect, the computing apparatus includes a data bus and the evictor unit is further configured to transmit data associated with the first block and data associated with the second block onto the data bus.

In yet a further aspect, the transmitted address, the transmitted data, and the transmitted notify signals are received by an external system supporting a cache coherence protocol for the plurality of processors.

In accordance with still another aspect of the present invention, the computing apparatus includes a buffer, typically a victim buffer, storing the data associated with the second block. The evictor unit is further configured, after selecting the second block, to transmit the address associated with the second block onto the address bus to an external system and to transmit a location of the buffer to the external system. The buffer is programmably configurable so that the external system can independently control at least one of pulling of the data associated with the second block from the buffer for transmission over the data bus to the external system and releasing of the data associated with the second block from the buffer.

In further accordance with the present invention, a method supports cache coherence protocols by presenting a clean victim signal to an external system. In this method, a block is selected to evict from one of a plurality of caches. The evicted block is removed from the one of the plurality of caches. The evicted block has either a modified cache state or an unmodified cache state. The address of the evicted block is transmitted to an external system which maintains cache coherency for the plurality of caches according to a cache protocol. It is then communicated to the external system that the evicted block is modified, if a modified block was evicted, or unmodified, if an unmodified block was evicted.

Preferably, a modified cache state may be one of dirty and dirty/shared. Preferably, an unmodified cache state may be one of clean and clean shared.

In a further aspect of the present invention, the evicted block has a modified cache state and the data of the evicted block is independently pullable and releasable by the external system.

Objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

BRIEF DESCRIPTION OF DRAWINGS

FIG. 2 is a block diagram of a processor with an L1 and an L2 cache in accordance with the present invention.

FIG. 4 is a block diagram of an L1 and L2 cache configuration having a victim buffer in accordance with the present invention.

FIG. 5 is a block diagram illustrating the set dirty operation in accordance with the present invention.

BEST MODE FOR CARRYING OUT THE INVENTION

Figure 1:
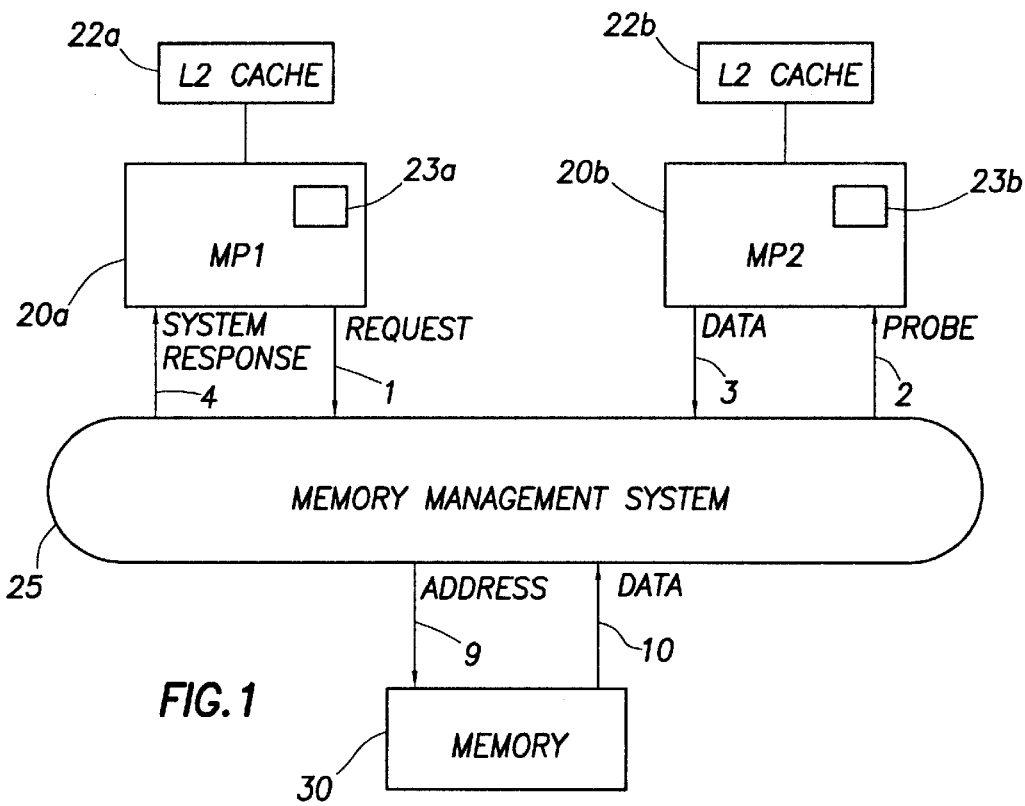
FIG. 1 is a multiprocessor shared memory system in accordance with the present invention.

FIG. 1 illustrates a multiprocessor system according to the present invention which includes two or more microprocessors 20, a memory management system 25 and a main memory 30. In FIG. 1, two microprocessors MP1 20a and MP2 20b are shown for the purpose of illustration, but such a multiprocessor system may have two or more processors. In another embodiment, MP1 and MP2 could be also be processors for computing other than microprocessors. In the preferred embodiment, a microprocessor (or processor) 20 may have more than one cache, including separate caches for instructions (not shown) and data. A cache may further be distinguished as being on the same chip (L1 cache) as the processor or externally connected to the processor chip via a cache bus (L2 cache). FIG. 1 shows microprocessor 20a coupled to L2 cache 22a and containing internal L1 cache 23a. Microprocessor 20b is coupled to external cache 22b and contains internal L1 cache 23b.

Preferably, the memory 30 is a group of main memory modules holding memory shared by the microprocessors of the multiprocessor system 25. The memory 30 forms a common address space referenced by the processors 20.

The memory management system 25 contains data and address/control buses for connecting the microprocessors and memory, as well as additional logic for implementing a coherence protocol for assuring the coherency of data distributed throughout the main memory 30 and caches 22 and 23. The memory management system 25 implements a particular cache coherence protocol chosen by a system designer for the multiprocessor system. The memory management system 25 may range in complexity from simple to complex depending on the particular protocol implemented. The memory management system could be a single bus or switch system connecting the processors to main memory with additional logic added to implement the protocol. The memory management system could, for example, have its own processor and additional data structures needed to implement a directory cache protocol. In one possible implementation of a multiprocessor cache control protocol according to the present invention, in a typical memory access sequence, microprocessor 20a makes a memory request 1 to memory management system 25 requesting a block of memory from main memory 30. The memory management system 25 converts memory request 1 into a probe 2 and sends probe 2 to each microprocessor 20b to determine whether the memory block is present in one of the caches. In this example, the memory block is in cache 22b or 23b of microprocessor 20b, and thus microprocessor 20b issues a probe response 3 returning the block of data 3 to the memory management system 25. The memory management system 25 then forms a system response 4 sending the block to microprocessor 20a which originally requested it. Alternately, if the block was not present in any of the caches, the memory management system 25 would retrieve the memory block 10 corresponding to address 9 from main memory 30 and transfers it by the system response 4 to the requesting microprocessor 20a. Thus, in this particular protocol, before the system 25 checks the main memory. 30, it first checks the memory from each cache of the other microprocessors to make sure that the request gets the latest copy.

FIG. 2 shows external system 25 interfacing to processor 20 via the system port 15. In a preferred embodiment, processor 20 is implemented as a processor embedded onto a single chip. The system port 15 is composed of a bidirectional data bus 24, a bidirectional command/address bus 26 and a control bus 27. The bidirectional command/address bus 26 transmits both command and address information (in both directions) between the external system 25 and the processor 20. The command and address information is multiplexed onto a single bidirectional command/address bus in order to reduce pin count on the processor chip. Commands are transmitted over the command/address bus 26 bidirectionally, i.e., from processor 20 to external system 25 and from external system 25 to processor 20. The control bus 27 denotes additional lines at system port 15 to transmit control and clock signals information between the external system 25 and processor 20.

The external system 25 represents any system connecting the processor 20 to the external world, i.e. input/output devices and memory. In FIG. 1, the external system 25 is a memory management system connecting the processor to other processors and main memory in a multiprocessor system. Thus, a memory management system is a particular instance of an external system. An external system is more general and could also include, for example, a uniprocessor configuration connecting the single processor to memory and input/output devices.

The external cache port 16 connects the processor 20 to an optional external cache 22, commonly referred to as the L2 cache. The external cache port 16 includes bidirectional data bus 24b and an address bus 26b. Processor 20 also contains a cache located internally on the same chip as the processor. The internal cache is commonly referred to as the L1 cache. In a preferred embodiment, the internal cache L1 would be located within processor 20, that is it would be on the same chip, and cache L2 would be a separate chip or chips located externally to the processor chip and connected to the processor chip through cache port 16.

The external unit 28 and system port 15 provides an external interface consisting of circuitry and data paths which allows the external system to have a significant degree of control over the caches 22 and 23 of processor 20 by issuance of commands to the processor through the command/address bus 26 and transference of data via the data bus 24. The external unit 28 generally denotes circuitry within processor 20 implementing the external interface and executing commands.

The processor 20 via external unit 28 generates external memory references, issues requests, and provides information to the external system through the address/command bus 26. The external system 25 sends commands to the processor 20 via the address/command bus 26. These commands change the state and effect data movement of the caches.

A summary of the commands pertinent to describing the present invention are shown in Table 1 below. An implementation of the present invention may have many more commands and each command may have a different format, e.g. more fields than illustrated herein.

The commands are divided into three broad groups: the internal reference commands, the external reference commands, and the system response commands. The internal reference commands store and load to the internal L1 cache or external L2 cache. The external reference commands issued by the processor to the external system access memory off-chip (i.e., not in the L1 or L2 cache) and provide data and control information to the external system. The system response commands generated by the external system provide data to the processor's internal cache and alter the internal caches state.

TABLE 1

| INTERNAL REFERENCES | COMMAND OUT (External References) | COMMAND IN (System Responses) |
|---|---|---|
| Load | RdBlk | SYSDC ReadData |
| Store | RdModBlk | SYSDC ReadData |
| Store | Set Dirty | SYSDC Success/Fail |
| Evict | WriteVictim/CleanVictim | SYSDC Release VB |
|  | Probe Response | Probe Command |

The Internal reference commands generated by the processor retrieve and store data to memory local to the processor, i.e. to the L1 and L2 caches. For example, the internal reference command "LOAD X R" would retrieve the data of Block X from one of the caches and place it into an internal register R. The internal reference command "STORE X R" command would store data from register R to the location in cache for Block X. If the referenced block X is not in either cache (a miss), then the processor will generate an external reference command, such as "RdBlk", to locate the block in memory external to the processor, or "RdModBlk", to store the block in the external memory. The internal reference command "Evict" removes the block from the cache.

The External Reference command "Rdblk" generated by the processor retrieves a block of data from memory located external to the processor. The "RdBlk X" command will be sent to the external system to read a block of data located at address "X" from the main memory. The processor will search for the block of data with a "RdBlk" command after failing to find the data in its internal caches (i.e., a cache miss). The command "RdModBlk" generated by the processor directs the external system to store a block of data to the memory.

The system response commands (SYSDC) are sent from the external system to the processor in response to the external reference commands.

In a typical memory reference load cycle, the processor will attempt to "Load" a memory block, generate a "RdBlk" to the external system in the situation when the block is not found in one of the internal caches, send the "RdBlk" to the external system to locate the block, and the external system returns the block with an "SYSDC ReadData" command.

In a typical memory reference store cycle, the processor will attempt to "Store" a block to the internal caches, generate a "RdModBlk" to the external system when the block is not in an internal cache, send the "RdModBlk" to the external system to store the block in the memory, and the external system provides any response with an "SYSDC ReadData" command. If the processor desires to set the block of the cache to a dirty state, the processor will send a "Set Dirty" request to the external system, and the external system will indicate the block can be set to a dirty state with the response "SYSDC Success", or cannot be set to a dirty state with the response "SYSDC Fail". These commands are discussed further below.

In response to an eviction of a block with the evict command, the processor may signal the external system with a "WriteVictim" or "CleanVictim" commands to communicate an evicted block's state to the external system. The external system may respond with the command "SysDC Release VB" to release the victim buffer (VB) holding the evicted block. The "WriteVictim" and "CleanVictim" commands are further discussed below.

The external system may send a "probe command" to a processor to locate a block of data and change the cache state for the block. In response to the "probe command" received by the external system, the processor may return the block of data with a probe response". In this situation, it is the external system which initiates an information exchange. These commands are further discussed below.

Figure 3:
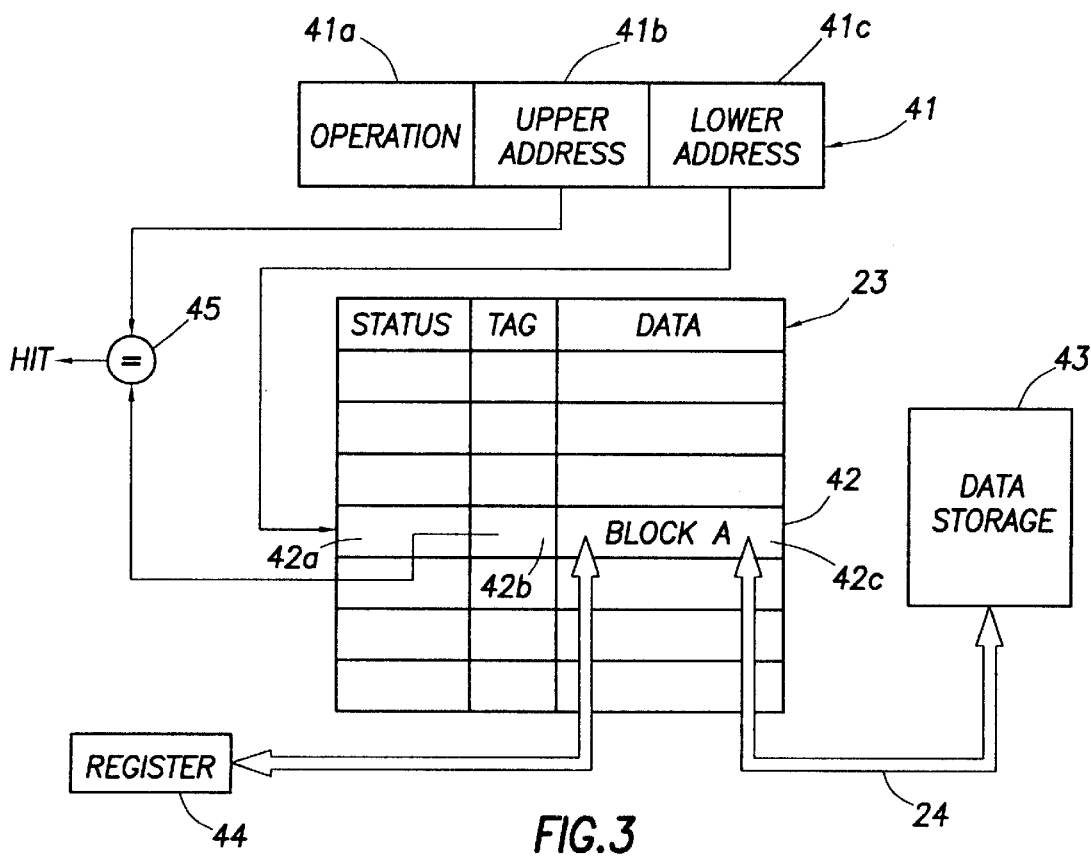
FIG. 3 is a block diagram illustrating the operations of a cache in accordance with the present invention.

FIG. 3 shows a simple embodiment of L1 cache 23 for purposes of illustrating the cache structure and operations. L2 Cache 22 would operate in a similar manner. The cache 23 is composed of a plurality of blocks; a typical block 42 denoted as block A. A block is meant to designate the minimum addressable unit of the cache and could be anything from a word to a larger group of words (e.g., 64 KBytes). The block has three fields: a coherence status field 42a which holds three bits indicating the coherence state of the block in cache, a tag 42b containing a part of the memory address for uniquely identifying the block in cache with the block in memory, and a data field 42c holding the data of the block. There are other embodiments of cache architectures which will work with the present invention, such as a two-way set-associate cache or a fully associative cache. The cache structure of FIG. 3 illustrates the operations of a cache pertinent to the present invention and other cache architectures would work similarly.

A block of a cache can be in one of several coherence states as stored in the coherence status field 42a. The states of a cache are summarized in Table 2.

TABLE 2

| STATE NAME | DESCRIPTION |
| --- | --- |
| Invalid | The block is not in the processor's cache. |
| Clean | The processor holds a read-only copy of the block, and no other agent in the system holds a copy. |
| Clean/Shared | The processor holds a read-only copy of the block, and another agent in the system may also hold a copy. Upon eviction, the block need not be written back into memory. |
| Dirty | The processor holds a read/write copy of the block, and must write it to memory after it is evicted from its cache. No other agent in the system holds a copy of the block. |
| Dirty/Shared | The processor holds a read-only copy of a dirty block which may be shared with another agent. The block must be written back to memory when evicted. |

The coherence state of each block in the cache is recorded by three state bits of the coherence status tag 42a: the valid bit, the shared bit, and the dirty bit. The valid bit indicates that the block contains valid data. The shared bit indicates that the block may be cached in more than one processor's cache. The dirty bit indicates that the cache block has been written to, rendering the memory copy of the block not current and thus the cache block must eventually be written back. These state bits allow the following states to be encoded for a given cache block or subblock; invalid, exclusive-modified (dirty), exclusive-unmodified (clean), shared-unmodified (clean/shared), and shared-modified (dirty/shared).

There are several logical consequence of the coherency state. A block in a clean state means that the cache has the exclusive copy of the block, besides the one residing in memory. A block in clean/shared state means that the block is clean and there is more than one copy of the block residing in other caches. If a dirty block is evicted from the cache, then the memory copy must be updated. If a clean block is evicted from the cache, since the memory copy is the same as the cache copy, the memory copy need not be updated. Dirty means that the processor has the only copy of the block and the processor can write to it. Dirty/shared means there is more than one copy of the block outstanding in other caches and the copy in the cache is a dirty read-only copy. Invalid means its not in the processor's cache. Referring to FIG. 3, the operation of "Load" and "Store" will now be described. For illustration purposes, the format of the "Load" command will be denoted "Load A R" meaning Load memory block A into internal Register R. Suppose a "Load A R" command is loaded into instruction register 41, where "Load" is indicated in field 41a and where the address is divided into a lower address 41c and upper address 41b. The lower address identifies one of the plurality of blocks in the cache having the lower address. Thus, all blocks in memory with an address modulo this lower address are mapped into the same location in the cache. The upper address 41b is then matched against the tag 42b in the location of cache memory indexed by the lower address 41c. The tag 42b is compared against the upper address 41b and if they match, generates a hit signal 45. This means the block is present in the cache. The "Load" instruction is then executed with the corresponding data 42c of Block A being loaded into an internal register 44. In a corresponding "Store" operation, upon a successful hit, the data from register 44 would be loaded into Block A and the status bit of the coherence status register 42a set to the dirty state. A data pathway 24 connects cache 22 to data storage 43. Data storage 43 denotes data storage which includes the local L1 and L2 caches and main memory.

System Tools for Control of Cache Coherency

The present invention provides the designer of memory management system 25 with a set of tools which can be used to implement any variety of coherency protocols known in the present art, including any-system ranging in complexity from a simple bus with additional logic added to a directory cache coherency system. These tools which allow an external system to change the internal state of a processor's cache are: (1) the system probe commands (Tables 3, 4), (2) the system data control response commands (Table 5), and (3) the internal acknowledge rules (Table 6).

Probe Command

The probe command enables the external system to retrieve data from a cache and change the cache's coherence state in a single command operation. A probe command as described herein has three fields, a data movement field, a next state field, and an address field. Another embodiment of a probe command, however, may contain more fields for carrying out the probe operation. In the present embodiment, as shown in FIG. 2, the probe command is submitted by the external system 25 to the processor 20 via the command/address bus 26 of the system port 15. The processor 20 executes the probe command and returns data on the data bus 15 as a Probe Response. The probe command submitted to the system port of the processor provides an external system the capability to retrieve data from the L1 and L2 caches of the processor and update the status of the caches.

As shown in TABLE 3, the data movement field of the probe command specifies the movement of data from the processor cache (L1 or L2) to the external system via the system port.

TABLE 3

| DATA MOVEMENT | FUNCTION |
| --- | --- |
| NOP | Do not deliver data on cache hit |
| Read if Hit | Deliver data simply on cache hit (optimize miss) |
| Read if Dirty | Deliver data on hit/dirty block |
| Read Anyway | Deliver data simply on cache hit (optimize hit) |

The code "read if hit" in the data movement field indicates that if the address of the block corresponding to the address field is in the cache (a hit) then return a copy of the data to the system port. The "read if dirty" is another data movement command that says return a block of data in the cache corresponding to the probe address only if the block is in the cache and it is dirty. The command "read anyway" is similar to "read if hit", in that the data is read if there is a data block in the cache. However, the command "read if hit" is optimal in the situation where a designer expects a miss most of the time; and the command "read if anyway" works optimally in the situation where a hit is expected. The NOP command does not return data and is used in the situation where it is only desired to change the state of the cache.

Table 4 denotes the possible entries in the "next state" field of the "probe command".

TABLE 4

| Next State | Function |
| --- | --- |
| NOP | keep old cache state the same |
| Clean | change cache state to clean |
| Clean/Shared | change cache state to clean/shared |

TABLE 4-continued

| Next State | Function |
| --- | --- |
| Invalid | change cache state to invalid |
| Trans3 | if clean then goto clean/shared |
| | if dirty then goto invalid |
| | if dirty/shared then goto clean/shared |
| Trans1 | if clean then goto clean/shared |
| | if dirty then goto dirty/shared |

The external system can control the internal state of the cache with the "next state" field of the probe command. When the "next state" field is "NOP", the probe command does not change the cache state. This could be used in the situation where only a data movement is desired. When the "next state" field is "clean" the probe command changes the cache state to "clean"; similarly the transitions indicated in Table 4 occur when the "next state" field is "clean/shared" or "invalid". The two next state's "Trans3" and "Trans1" transition to a next state conditioned on the current state of the cache. For example, when the "next state" field is "trans3", if the current state is clean, then the probe command will set the next state to clean/shared; if dirty then the next state will be set invalid, if dirty/shared then the next state will be set to clean/shared. Similar operations occur for the "Trans1" according to the description in Table 4.

For purposes of illustrating the operation of the probe command, consider a probe command having the format "Probe address data_movement next_state", where "address" indicates the address of a block of memory, "data_movement" indicates one of the values from Table 3 and "next_state" indicates one of the values from Table 4. The execution of the probe command proceeds as follows. First, external system 25, which contains logic to generate this probe command, generates this probe command and then presents this command on the address/command bus 26 to the processor 20. The external unit 28 within processor 20 executes the probe command by locating the block in its cache denoted by the "address" field, performing the data movement indicated by the "data_movement" value of the data movement field by presenting the data of the block with "address" onto the data bus 24 (ProbeResponse command), and changing the state of cache 22 or 23 as directed by the "next_state" field.

A significant aspect of the probe command, is that the external system can present a single command to the processor, and both the data movement and cache state change will occur by executing this single command. This assures that no intervening instructions are executed between these two operations, as may be the case, for example, when two separate commands are submitted to a processor which uses pipeline parallelism.

System Data Control Response Commands

Table 5 shows the basic types of the System Data Control Response Commands (SYSDC).

TABLE 5

| Response Type | Function |
| --- | --- |
| SYSDC ReadData | Fill block with data and update tag with clean cache status. |
| SYSDC ReadDataDirty | Fill block with data and update tag with dirty cache status. |
| SYSDC ReadDataShared | Fill block with data and update tag with clean/shared cache status. |

TABLE 5-continued

| Response Type | Function |
| --- | --- |
| SYSDC ReadDataShared/Dirty | Fill block with data and update tag with dirty/shared status. |
| SYSDC SetDirty Success | Unconditionally update block with dirty cache status |
| SYSDC SetDirty Fail | Do not update cache status. |

As shown in TABLE 5, the SYSDC response commands 4 are sent from the external system 25 to the processor 20. The SYSDC commands gives the external system 25 the ability to update a data block in a private cache of a processor and change the state of the cache using a single command. SYSDC commands are sent by the external system to the processor in response to a request from the processor to the external system to access a block of data from the external system.

For purposes of illustrating the operation of the SYSDC command, consider an SYSDC command having the format "SYSDC address response-type", where "address" indicates the address of a block of memory, and "response_type" indicates one of the values from Table 5. As an example, assume that the external system has generated the command "SYSDC ReadData Block A". The external system 25 presents this command to processor 20 on the command/address bus 26. The external unit 28 of processor 20 executes this command by reading the data associated with Block A provided by the external system 25 on the data bus 24 and filling the corresponding location for Block A in cache 22 or 23 with this data. Next, the external unit 28 of processor 20 sets the coherence status 42a of Block A to the clean state.

Referring back to Table 5, the System Data Control Response Commands are sent by the system in the processor in response to a system request. In the "SYSDC ReadData Block A" command, the system delivers data for Block A to cache and updates the tag status of the block to clean. A simple example of use of the SYSDC command would be as follows: 1) a processor executes a "Load Block A" command to retrieve Block A from the cache, 2) the processor action is to first check the cache, and, in this example, generates a miss because Block A is not in the cache, 3) because the block has been determined to not be in the cache, the processor generates a RdBlk command and sends it to the external system to retrieve the block from external memory, 4) the external system finds the block either in memory or the caches of other processors using a probe command and then returns the block by presenting the command "SYSDC ReadData Block A" which fills the block with data and updates the tag of the block with clean status.

Combination of Probe and SYSDC Commands

Referring to FIG. 1, the following example illustrates how the above-described external commands (i.e., SYSDC, Probe) are combined to implement a typical memory reference operation in a multiprocessor system. Referring to FIG. 1, designate processor 20a as MP1 and processor 20b as MP2. In this example, an initial state will be assumed with block A not being resident in MP1, but resident in MP2 in a dirty state. Processor MP1 initiates the memory reference by executing a "LOAD" command to load memory block A into an internal register of MP1. Because, block A does not appear in MP1's cache (miss), MP1 initiates a memory request 1 for block A (RdBlk) to the memory management system 25. In response, the memory management system 25 sends a probe command 2 to MP2. In this example, the memory management system generates a Probe command with "read if hit" in its data movement field and "clean/shared" in its next state field. In this example, the system 25 has the intelligence that Block A is in the cache of MP2 in a dirty state. In executing the Probe command, MP2 will return the data to system 25 in a probe response and set the state of the block in cache of MP2 from "dirty" to "clean/shared". The "clean shared" state denotes that another processor will have a copy (shared status) and the block is now read-only (clean). In order to assure the cache is in a clean state, the system 25 updates the memory 30 to make the memory consistent with the cache copy. Memory management system 25 then generates a system data response command "SYSDC ReadDataShared" which sends block A to MP1 and puts it in a clean/shared state. There are other alternative scenarios depending on the particular memory management system 25. A memory management system will very in the particular cache protocol implemented and in its state of intelligence, i.e. how much the memory management system knows about the state of the caches and memory. The memory management system may only have partial knowledge of the cache system states. For example, the system may not know whether the MP2 cache state for Block A is clean or dirty. In this case, system 25 may submit a probe to MP2 with data movement "Read if Dirty" and next state "Trans1". The response of MP2 would be to set the cache state to clean/shared if it was previously clean or to dirty/shared if it was previously dirty.

Internal Acknowledge Rules

The third set of tools, the internal acknowledge rules, gives the external system the ability to control several internal cache transactions of a cache and to access cache buffers holding data of the cache. This gives the multiprocessor system designer the flexibility to design cache protocols which can take advantage of this control and intelligence. The processor 20 has the ability to function as either a processor in a uniprocessor system or as a processor in a multiprocessor system. The processor 20 contains a set of control and status registers (CSR) which when set indicate to the external unit 51 whether to internally acknowledged or externally acknowledged cache-related transactions associated with an operation being performed on the cache. Internal acknowledgment means that the transactions of an operation are performed entirely by components within the processor chip without access to the external system. External acknowledgment means that, in order to perform a cache-related transaction, the processor must request information from the external system, to complete the transactions of the operation. A processor in a uniprocessor system internally acknowledges most of its cache-related transactions. A processor in a multiprocessor system seeks external acknowledgment for cache-related transactions from the memory management system, the memory management system being responsible for assuring the coherency of the entire memory including all caches and main memory in the multiprocessor system.

The external unit 28 includes the CSR registers, which set the mode of the processor so that it either internally acknowledges or externally acknowledges the particular operation associated with the control and status registers (CSR). Two CSR's relevant to the present invention are: clean_victim enable, and set_dirty_enable. The clean_victim enable register, when set, indicates an eviction of a clean block will be communicated to the external system. Notice of a dirty block is always given to the external system by an existing writevictim block operation. The set_dirty enable register informs the external unit 28 that a set_dirty operation needs acknowledgment from the external system before the external unit can set the cache block state to dirty.

FIG. 4 discloses in an embodiment of processor 20 further components of the processor 20 relevant to the internal acknowledge rules of the present invention including an instruction register 41, an external unit 28, an internal register 44, an L1 data cache 23, a victim buffer 54, and a bus interface 56. The bus interface 56 connects the processor 20 to L2 data cache 22 via cache port 16 and memory management system 25 and memory 30 via system port 15.

The external unit 28 executes operations loaded from the instruction register 41. Register 41 holds in the operation field 41a the instruction, such as "Load" and "Store", which operate on a block in the cache having an address indicated by the address field 41b. Register 44 is an internal register holding the result of operation 41a. As an example, suppose a "LOAD X Register" instruction is loaded into instruction register 41. The external unit 28 retrieves the data block in L1 cache 23 having address X and loads it into register 44. However, if the data block is not in the L1 cache 23 (a miss), the external unit 28 will try to retrieve the block from the L2 cache 22. If the data block is not in the L2 cache, the external unit 28 will then make an external reference request to the memory management system 25. External unit 28 sends control signals to the L1 cache 23 via line 60 and to the L2 cache 22 via line 61.

Clean Victim Operation

An eviction operation removes a block of data from the cache. A block may be evicted from the cache, for example, to make room for a more recent memory reference. When a block is evicted, if the block is dirty, it needs to be written into memory. This is done with a writevictim operation. But when the block is clean it need not be written back into memory. In principal, an eviction of a clean block is a procedure internal to the processor and need not be reported to the external system. In the case where the block is dirty, the block has to be written back to the memory; hence the external system is notified, notification being realized by the writevictim operation itself. But, in some cache protocols, the external system keeps track of the blocks in cache with a directory structure noting the blocks in cache and their current states. Thus, these external systems would require a signal from the processor reporting a cache eviction, regardless of whether the block is clean or dirty. The clean victim operation informs the external system that the processor is deallocating a clean block. Notice of deallocation of a dirty block is accomplished by the writevictim block operation.

Referring to FIG. 4, in executing an "evict" command, external unit 28 sends a control signal 60 to L1 cache 23 which may take, for example, the least recently used (LRU) block from data cache 23 and put it into victim buffer 54. Victim Buffer 54 store a data block which has been evicted from the cache 23. External unit 28 then sends a CleanVictim signal to memory management system 25 on control line 61 informing the memory management system that a block has been evicted and that it is stored in the victim buffer 54.

Flow Control

The processor 20, provides the additional operation of a flow control. When a block is evicted, the block is put into data buffer 54. The data buffer 54 is commonly referred to as the victim buffer (VB). The external system 25 can pull the data from buffer 54 and release the buffer 54 independently, by sending the command "SysDC Release VB" shown in Table 1 to processor 20. When the processor evicts the clean block, the address of the block is given to the external system along with a signal indicating the clean block has been evicted along with location of buffer 54. The external system can then pull the data independently from releasing the buffer. So, for example, on an eviction, the system can pull data from buffer 54, and then release the buffer sometime later. The system can use this flexible feature to handle data flow efficiently. For example, after evaluating the pulled data, the system may decide to reload the evicted block rather than storing it to memory.

Set Dirty Operation

FIG. 5 illustrates the transaction of a set dirty operation. This transaction proceeds as follows. In a set dirty operation, the processor 20 wishing to store data to a block in the cache generates an internal signal to set the block of the cache 22 or 23 to a dirty state. In a uniprocessor system, this would not require any interchange with an external system and the block could be immediately set to dirty. However, in a multiprocessor system, a set dirty operation must first be approved by the external system 25. External system 25 checks the set dirty request against the state of the other caches in the other processors, as well as the main memory, according to its cache protocol.

Referring to FIG. 5, processor 20 sends a set dirty request 33 to external system 25. That is, referring to FIG. 2, external unit 28 of processor 20 sends a set dirty request over the address/command bus 15 to the external system 25, by executing the "Set Dirty" command of Table 1. In a multiprocessor system, the external system would be the memory management system. External system 25 processes the request depending on the particular cache protocol. This may entail the external system sending probes to other processors. Upon completion of the process of probing memory, the external system then sends an acknowledge signal 34 to processor 20. Table 5 shows the two commands "SYSDC SetDirty Success" and "SYSDC SetDirty Fail" used by the external system to acknowledge a set dirty request 33. If the external system determines that the processor may write to cache, the external system 25 will send acknowledge signal 34 by the command "SYSDC SetDirty Success" to processor 20 indicating that the block in cache can be set to dirty (success) and the block written to. Alternately, if it is determined that the processor may not write to cache, the external system 25 will send acknowledge signal 34 by the command "SYSDC SetDirty Fail" to processor 20 indicating that the block in cache cannot be set to dirty (failure) and the processor may try later.

The following illustrates the use of a set dirty operation. Assume, for this example, that there are two processors MP1 and MP2 and both caches in MP1 and MP2 have a block A in clean shared state. Further assume that both processors wish to write for whatever reason on data block A. Both processors MP1 and MP2 looking to write to block A simultaneously generate set dirty commands to the external system 25. The external system has the logic necessary to look at both of these processors trying to change the state of Block A, and decides which processor to give priority. If, for example, MP2 is given priority, then the external system will send back to MP2 an acknowledgment signal 34 indicating success, which simply means go ahead and write to block A. It then returns an acknowledgment to MP1 with an acknowledgment signal indicating failure which says that the processor cannot write to the block. The external system 25 could further generate a probe command to MP1 which changes the state of block A in MP1 to invalid. Thus, in this final state, block A in MP1 is invalid and block A in MP2 is dirty. In this state, only MP2 can write to block A until the system again changes state.

The set_dirty_enable register indicates whether the processor handles set dirties internally (internal acknowledge)

or must send a set dirty request off-chip to the external system (external acknowledge). Table 6 illustrates the possible modes of the set dirty operation as determined by setting the set_dirty enable register to the corresponding bit sequence.

TABLE 6

| SET_DIRTY ENABLE | ACTION |
|---|---|
| 000 | All set_dirties acknowledge internally |
| 001 | Only clean blocks generate external set_dirty |
| 010 | Only clean/shared blocks generate external set_dirty |
| 011 | Only clean/shared and clean blocks generate external set_dirty |
| 100 | Only dirty/shared blocks generate external set_dirty |
| 101 | Only dirty/shared and clean blocks generate external set_dirty |
| 110 | Only shared blocks generate external set_dirty |
| 111 | All set_dirties go to external system. |

When set_dirty_enable is set to 000, all set dirties are acknowledged internally. This sequence would be used in a uniprocessor system. In a uniprocessor system, there is no need to inquire as to the state of an external system, and all set dirty operations are automatically granted. When set dirty_enable is set to 111, all set dirties are automatically presented to the external system. The other modes present the set_dirty operation to the external system conditioned on the coherence state of the block.

What is claimed is:

1. A computing apparatus, comprising:
a cache including a plurality of blocks;
an evictor unit configured to select a first block of data having an unmodified coherence state from the plurality of blocks to remove from the cache;
a signaling unit configured to transmit a notify signal to an external system indicating the removal of the first block from the cache;
a victim buffer storing the data associated with the first block of data selected by the evictor unit, the buffer being programmably configurable so that the external system can independently control pulling of the data associated with the first block from the buffer for transmission over the data bus to the external system and releasing of the data associated with the first block from the buffer; and
wherein the unmodified coherence state of the first block in the cache is a clean coherence state and the notify signal is a clean victim signal.

2. The computing apparatus of claim 1, wherein:
the evictor unit and the signaling unit are included in an external unit having an interface for communication of information to an external system.

3. The computing apparatus of claim 1, wherein:
the cache is one of an L1 cache and an L2 cache.

4. The computing apparatus of claim 1, wherein:
the evictor unit is further configured to select a second block from the plurality of blocks, the second block having a modified coherence state; and
the signaling unit is further configured to transmit another notify signal indicating removal of the second block from the cache.

5. The computing apparatus of claim 4, wherein the modified coherence state of the second block in the cache is a dirty coherence state and the another notify signal is a write victim signal.

6. The computing apparatus of claim 4, further comprising:
an address bus,
wherein the evictor unit is further configured to transmit an address associated with the first block and an address associated with the second block onto the address bus.

7. The computing apparatus of claim 6, further comprising:
a data bus,
wherein the evictor unit is further configured to transmit data associated with the first block and data associated with the second block onto the data bus.

8. The computing apparatus of claim 7, wherein
the transmitted address, the transmitted data, and the transmitted notify signals are received by an external system supporting a cache coherence protocol for the plurality of processors.

9. A computing apparatus, comprising:
first cache including a plurality of blocks of data; and
a processor configured to select a block of data of the plurality of blocks of data to evict from the first cache, the selected block having one of a clean coherence state and a dirty coherence state, to communicate a signal indicating eviction of the selected block to an external system managing caches of a multiprocessor system, including the first cache, and to communicate the eviction of the selected block to the external system by a clean victim signal if the selected block has a clean coherence state and a write victim signal if the selected block has a dirty coherence state; wherein
the processor further includes a victim buffer configured to receive data of the selected block, the victim buffer being configured so that the external system can independently pull and release the data of the selected block.

10. The computing apparatus of claim 9, wherein:
the data of the selected block is pulled by the external system over a data bus by signaling the processor to transfer the data.

11. The computing apparatus of claim 9, wherein:
the data of the selected block is released by the external system signaling the processor to deallocate the block from the victim buffer.

12. A method for supporting cache coherence protocols by presenting a clean victim signal to an external system, comprising the steps of:
selecting a block to evict from one of a plurality of caches;
removing the evicted block from the one of the plurality of caches, the evicted block having an unmodified cache state;
transmitting the address of the evicted block to an external system which maintains cache coherency for the plurality of caches according to a cache protocol; and
communicating to the external system that the evicted block is unmodified;
receiving the data of the evicted block in a victim buffer; and
pulling the data of the evicted data block by the external system.

13. The method of claim 12, wherein:
an unmodified cache state is one of clean and clean shared.

* * * * *